United States Patent
Kusmanoff et al.

(10) Patent No.: US 8,397,054 B2
(45) Date of Patent: Mar. 12, 2013

(54) MULTI-PHASED COMPUTATIONAL RECONFIGURATION

(75) Inventors: Antone L. Kusmanoff, Greenville, TX (US); Matthew P. DeLaquil, Rockwall, TX (US); Deepak Prasanna, Rockwall, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 477 days.

(21) Appl. No.: 12/655,182

(22) Filed: Dec. 23, 2009

(65) Prior Publication Data

US 2011/0154012 A1 Jun. 23, 2011

(51) Int. Cl.
*G06F 15/177* (2006.01)
*G06F 1/24* (2006.01)

(52) U.S. Cl. .............................. 713/100; 713/1; 712/15

(58) Field of Classification Search .............. 713/1, 100; 712/15
See application file for complete search history.

(56) References Cited

U.S. PATENT DOCUMENTS

| | | |
|---|---|---|
| 4,528,658 A | 7/1985 | Israel |
| 5,361,373 A * | 11/1994 | Gilson .............. 712/1 |
| 5,737,235 A | 4/1998 | Kean et al. |
| 5,802,290 A | 9/1998 | Casselman |
| 5,838,167 A | 11/1998 | Erickson et al. |
| 5,931,959 A | 8/1999 | Kwiat |
| 5,941,988 A | 8/1999 | Bhagwat et al. |
| 5,946,219 A * | 8/1999 | Mason et al. .................. 716/117 |
| 5,953,372 A | 9/1999 | Virzi |
| 6,020,755 A | 2/2000 | Andrews et al. |
| 6,075,380 A | 6/2000 | Lane |
| 6,172,927 B1 | 1/2001 | Taylor |
| 6,201,829 B1 | 3/2001 | Schneider |
| 6,233,704 B1 | 5/2001 | Scott et al. |
| 6,259,693 B1 | 7/2001 | Ganmukhi et al. |
| 6,292,923 B1 | 9/2001 | Genrich et al. |
| 6,333,641 B1 | 12/2001 | Wasson |
| 6,339,819 B1 | 1/2002 | Huppenthal et al. |
| 6,381,238 B1 | 4/2002 | Hluchyj |
| 6,385,236 B1 | 5/2002 | Chen |
| 6,389,379 B1 | 5/2002 | Lin et al. |
| 6,421,251 B1 | 7/2002 | Lin |
| 6,496,291 B1 | 12/2002 | Raj et al. |
| 6,496,505 B2 | 12/2002 | La Porta et al. |
| 6,614,267 B2 | 9/2003 | Taguchi |
| 6,617,877 B1 | 9/2003 | Cory et al. |

(Continued)

FOREIGN PATENT DOCUMENTS

GB 2377138 A 12/2002

OTHER PUBLICATIONS

Laxdal, "ELEC 563 Project Reconfigurable Computers", http://www.ece.uvic.ca/~elaxdal/Elec563/reconfigurable_computers.html; printed from the Internet Dec. 19, 2003, Dec. 2, 1999, 10 pgs.

(Continued)

*Primary Examiner* — Thuan Du
(74) *Attorney, Agent, or Firm* — O'Keefe, Egan, Peterman & Enders LLO (57) ABSTRACT

Problem solution speed may be increased by dynamically changing processing device computational hardware configuration in concert with respective mathematical phases of an algorithm to match accuracy demands at various phases of computation. Smaller but faster hardware structures may be increased in size using real-time partial or full reconfiguration of a processing device to apply the smallest and fastest possible computational structure for the needed accuracy during each of multiple computational phases.

21 Claims, 5 Drawing Sheets

U.S. PATENT DOCUMENTS

| | | |
|---|---|---|
| 6,651,225 B1 | 11/2003 | Lin et al. |
| 6,668,361 B2 | 12/2003 | Bailis et al. |
| 6,721,313 B1 | 4/2004 | Van Duyne |
| 6,754,881 B2 | 6/2004 | Kuhlmann et al. |
| 6,873,180 B2 | 3/2005 | Bentz |
| 6,888,376 B1 | 5/2005 | Venkata et al. |
| 6,901,072 B1 | 5/2005 | Wong |
| 6,934,763 B2 | 8/2005 | Kubota et al. |
| 6,965,571 B2 | 11/2005 | Webber |
| 6,993,032 B1 | 1/2006 | Dammann et al. |
| 7,003,585 B2 | 2/2006 | Phong et al. |
| 7,020,147 B1 | 3/2006 | Amadon et al. |
| 7,035,228 B2 | 4/2006 | Baumer |
| 7,111,110 B1 | 9/2006 | Pedersen |
| 7,137,048 B2 | 11/2006 | Zerbe et al. |
| 7,188,283 B1 | 3/2007 | Shafer et al. |
| 7,224,184 B1 | 5/2007 | Levi et al. |
| 7,260,650 B1 | 8/2007 | Lueckenhoff |
| 7,389,487 B1 | 6/2008 | Chan et al. |
| 7,404,170 B2 | 7/2008 | Schott et al. |
| 7,415,331 B2 | 8/2008 | Dapp et al. |
| 7,426,599 B2 | 9/2008 | Yancey et al. |
| 7,439,763 B1 | 10/2008 | Kavipurapu et al. |
| 7,444,454 B2 | 10/2008 | Yancey et al. |
| 7,453,899 B1 | 11/2008 | Vaida et al. |
| 7,506,297 B2 | 3/2009 | Mukherjee et al. |
| 7,518,396 B1 | 4/2009 | Kondapalli et al. |
| 7,577,726 B1 | 8/2009 | Conard et al. |
| 2002/0021680 A1 | 2/2002 | Chen |
| 2002/0057657 A1 | 5/2002 | La Porta et al. |
| 2002/0059274 A1 | 5/2002 | Hartsell et al. |
| 2002/0095400 A1 | 7/2002 | Johnson et al. |
| 2003/0009585 A1 | 1/2003 | Antoine et al. |
| 2003/0026260 A1 | 2/2003 | Ogasawara et al. |
| 2003/0167340 A1 | 9/2003 | Jonsson |
| 2004/0085902 A1 | 5/2004 | Miller et al. |
| 2004/0131072 A1 | 7/2004 | Khan et al. |
| 2004/0156368 A1 | 8/2004 | Barri et al. |
| 2004/0158784 A1 | 8/2004 | Abuhamdeh et al. |
| 2004/0240468 A1 | 12/2004 | Chin et al. |
| 2004/0249964 A1 | 12/2004 | Mougel |
| 2005/0044439 A1 | 2/2005 | Shatas et al. |
| 2005/0169311 A1 | 8/2005 | Millet et al. |
| 2005/0175018 A1 | 8/2005 | Wong |
| 2005/0183042 A1 | 8/2005 | Vogel et al. |
| 2005/0242834 A1 | 11/2005 | Vadi et al. |
| 2005/0248364 A1 | 11/2005 | Vadi et al. |
| 2006/0002386 A1 | 1/2006 | Yik et al. |
| 2007/0101242 A1 | 5/2007 | Yancey et al. |
| 2007/0109105 A1 | 5/2007 | Ohno et al. |
| 2007/0194807 A1 | 8/2007 | Reblewski et al. |
| 2007/0276959 A1 | 11/2007 | Yancey et al. |
| 2008/0117908 A1 | 5/2008 | Kuo et al. |
| 2009/0072858 A1 | 3/2009 | DSouza et al. |
| 2011/0025376 A1 | 2/2011 | Grittke et al. |

OTHER PUBLICATIONS

"PCI/DSP-4 Four Complete Channels of Digital Acoustic Emission Data Acquisition on a Single Board", http://www.pacndt.com/products/Multichannel/pcidsp.html, printed from the Internet Dec. 19, 2003, 3 pgs.

Zaiq Technologies, "Innovation: Methodology Briefs", http://www.zaiqtech.com/innovation/m_fpga.html, printed from the Internet Jan. 15, 2004, 12 pgs.

Hardt et al, "Flysig: Dataflow Oriented Delay-Insensitive Processor for Rapid Prototyping of Signal Processing", (obtained from Internet Dec. 2003), 6 pgs.

Chang et al., "Evaluation of Large Matrix Operations on a Reconfigurable Computing Platform for High Performance Scientific Computations," (obtained from Internet Dec. 2003), 10 pgs.

Alfke, "FPGA Configuration Guidelines," XAPP, 090 Nov. 24, 1997, Version 1.1, pp. 31-38.

"XC18V00 Series of In-System Programmable Configuration PROMs", Xilinx Product Specification, DS026 (v.3.0), Nov. 12, 2001, 19 pgs.

Thacker, "System ACE Technology: Configuration Manager Breakthrough", New Technology, FPGA Configuration, Xcell Journal, Summer 2001, pp. 52-55.

"System ACE MPM Solution", Xilinx Product Specification, DS087 (v1.0) Sep. 25, 2001, 29 pgs.

"RapidIO™: An Embedded System Component Network Architecture", Architecture and Systems Platforms, Feb. 22, 2000, 25 pgs.

"Raceway Internlink Functional Specification", Mercury Computer Systems, Inc., Nov. 8, 2000, 118 pgs.

"[XMC-3310] High Speed Transceiver ePMC Module", Spectrum Signal Processing, http://www.spectrumsignal.com/Products/_Datasheets/XMC-3310_datasheet.asp, (© 2002-2004), 5 pgs. (this reference describes a product available prior to the May 11, 2004 filing date of the present application).

"XMC-3310 High Speed Transceiver ePMC Module", Spectrum Signal Processing, Rev. May, 2004, 4 pgs. (this reference describes a product available prior to the May 11, 2004 filing date of the present application).

RocketIO™ Transceiver User Guide, Xilinx, UG024 (v2.3) Feb. 24, 2004, 152 pgs.

"The FPGA Systems Connectivity Tool", Product Brief, Nallatech, DIMEtalk 2.1, Feb. 2004, pp. 1-8.

B. Hall, "BTeV Front End Readout & Links", BTEV Co., Aug. 17, 2000, 11 pgs.

Irwin, "Usage Models for Multi-Gigabit Serial Transceivers", Xilinx, xilinix.com, White Paper, WP157 (v1.0), Mar. 15, 2002, 10 pgs.

Campenhout, "Computing Structures and Optical Interconnect: Friends or Foes?", Department of Electronics and Information Systems, Ghent University, Obtained from Internet Oct. 8, 2006, 11 pgs.

Morris et al., "Pipelined Datapath for an IEEE-754 64-Bit Floating-Point Jacobi Solver", Sep. 2005, 2 pgs.

Zhuo et al., "Sparse Matrix-Vector Multiplication on FPGAs", FPGA, Feb. 20-22, 2005, 12 pgs.

Fithian et al., "Iterative Matrix Equation Solver for a Reconfigurable FPGA-Based Hypercomputer", Sep. 2002, 14 pgs.

Yancey et al., "Heterogeneous Computer Architecture Based on Partial Reconfiguration", Copending U.S. Appl. No. 12/655,181, filed Dec. 23, 2009; 28 pgs.

E. Hazen, "HCAL HO Trigger Link", Optical SLB-HTR Interface Specification, May 24, 2006, 4 pgs.

G. Russell, "Analysis and Modelling of Optically Interconnected Computing Systems", School of Engineering and Physical Sciences, Heriot-Watt University, May 2004, 170 pgs.

* cited by examiner

MULTI-PHASED COMPUTATIONAL RECONFIGURATION

FIELD OF THE INVENTION

This invention relates generally to reconfigurable integrated circuit devices, and more particularly to integrated circuit devices that are reconfigurable.

BACKGROUND OF THE INVENTION

Computational solutions found in general processing computers run in a serial sequential fashion. Multi-core processing computers and parallel processing systems using clustered CPUs are designed with software control to use fixed point, single precision or double precision floating point formats. Considerable research has been applied to advance the mapping of scientific computing algorithms onto field programmable gate array (FPGA) hardware that can take advantage of parallel processing for faster speed. This research has been focused on developing tools, such as floating-point linear system solvers, for general applications in fixed FPGA configurations. The success of that research is primarily based on the computational power of the FPGA.

SUMMARY OF THE INVENTION

Disclosed herein are systems and methods that may be implemented to increase problem solution speed by dynamically changing processing device computational hardware configuration in concert with respective mathematical phases of an algorithm "on the fly" in order to match accuracy demands at various phases of computation. In this regard, appropriate sizes of hardware computation structures may be advantageously applied to match the accuracy needs during changing phases of computation. Using the disclosed systems and methods, smaller but faster hardware structures may be increased in size using real-time partial or full reconfiguration of a processing device to advantageously apply the smallest and fastest possible computational structure for the needed accuracy during each computational phase. This is as opposed to conventional single-phase computational technology which uses a single computational hardware structure having corresponding to the highest required accuracy (and slowest computation speed) for a given computation problem during all computational phases.

Using the disclosed systems and methods, High Performance Computing (HPC) architecture structures may be applied to decrease solution times for computational problems that often take multiple days of conventional parallel computer time to reach a satisfactory solution, and even longer using conventional serial computation. Specifically, reconfigurable processing device hardware (e.g., such as a reconfigurable FPGA) may be applied in a multi-phased approach to balance computational accuracy and speed in order to achieve a significant speedup over the processing speed achieved from conventional FPGAs, providing a hardware reconfiguration process that has real-time processing implications for military mission and other processing systems. Specifically, a phased hardware precision approach may be implemented to use faster but less accurate hardware configurations on the earliest computation phases while accuracy demands are low, and then changing the hardware architecture configuration in real time to higher accuracy configurations having slower computational time when the problem approaches the higher solution accuracy threshold of the final result.

In one embodiment of the disclosed systems and methods, multiple hardware phases may be mapped to multiple algorithm phases for the solution of iterative problems using a reconfigurable integrated circuit processing device such as a field programmable gate arrays (FPGAs). Iterative solutions to linear algebra problems are an example of one of the problem types that take the longest solution times and that have increasing accuracy demands that are tied to the increasing iteration number. However, the disclosed calculation speedup made possible by using hardware structure reconfiguration to balance computational speed and accuracy is applicable in any computation or processing situation where solution accuracy varies and time processing is lengthy. Weather modeling for weather forecasts, map accuracy, geophysical exploration and x-ray data processing, and computational fluid dynamics (CFD) are just a few examples of processing applications where computational accuracy varies depending on the current phase of algorithm processing, e.g., where initial scans are at lower accuracy sweeps and later focused scans demand higher accuracies after detection processes have been completed, or vice-versa.

Using the disclosed systems and methods, speed may be leveraged against accuracy for particular phases of an iterative calculation process performed by a processing device, while at the same time retaining overall accuracy for the calculation process. The disclosed systems and methods may be implemented in one exemplary embodiment to enable dynamic trade of computational speed for numerical precision to accelerate iterative convergence without loss of any precision in the final result. In one embodiment, multiple hardware phases may be mapped into multiple algorithm phases for the solution of a set of linear equations, e.g., to achieve higher performance computing activity in a smaller package. The disclosed systems and methods may further be implemented with on-the-fly reconfigurability that is coupled to the phases of a solution algorithm to yield a rank of solutions where the hardware and the algorithm are dependently orchestrated as a high performance integrated system.

Using the disclosed systems and methods, dynamic reconfigurability may be implemented to allow all or part of a FPGA or other processing device to be reused "on the fly" in a different capacity for different applications in the same installation. This process may be accomplished using co-dependently designed algorithm work that is tied to changing hardware structures to take advantage of dynamic partial or full reconfiguration on-the-fly. In one embodiment, the FPGA or other processing device may be prefigured with all required hardware setups. Each setup is loaded and then executed at the appropriate time as the phases of the algorithm progress. Dependent prefiguring of both the algorithm and the hardware may be implemented to enable speed improvements over single configuration algorithms and hardware. Thus, there is a prefigured aspect to the solution based on the hardware and a dynamic aspect based on the problem data.

In one respect, disclosed herein is a method for dynamically reconfiguring a processing device, including: providing a reconfigurable processing device, the processing device being at least partially reconfigurable from a first computational structure configured to process data with a first precision at a first computational speed to a second computational structure configured to process data with a second precision at a second computational speed, the second precision and second computational speed being different than the first precision and the first computational speed; processing data with the first computational structure in a first computational phase to produce a first phase solution; then dynamically reconfiguring at least a portion of the processing device from the first computational structure to the second computational structure; and then processing data of the first phase solution with the second computational structure in a second computational phase to produce a second phase solution.

In another respect, disclosed herein is a system for dynamically reconfiguring a processing device, including: a reconfigurable processing device configured with a first computational structure configured to process data with a first precision at a first computational speed, the processing device being at least partially reconfigurable from the first computational structure to a second computational structure configured to process data with a second precision at a second computational speed, the second precision and second computational speed being different than the first precision and the first computational speed; and a computer processing system coupled by a datapath to the reconfigurable processing device, the computer processing system including memory and the second computational structure being prefigured in the memory of the computer processing system. The computer processing system may be configured to dynamically reconfigure at least a portion of the processing device from the first computational structure to the second computational structure after data is processed with the first computational structure in a first computational phase to produce a first phase solution and before data of the first phase solution is processed with the second computational structure in a second computational phase to produce a second phase solution.

In another respect, disclosed herein is a method of for dynamically reconfiguring a processing device, including: providing a reconfigurable processing device configured to execute a mathematical algorithm having multiple phases; and dynamically changing the configuration of the reconfigurable processing device while executing the algorithm on the reconfigurable processing device from a first computational structure corresponding to the accuracy requirements of a first phase of the mathematical algorithm to a second computational structure corresponding to the accuracy requirements of a second phase of the mathematical algorithm.

DESCRIPTION OF ILLUSTRATIVE EMBODIMENTS

In various embodiments of the systems and methods disclosed herein, computational structures having different levels of precision and correspondingly different computational speeds may be interchanged for each other in real time within a reconfigurable processing device, e.g., in a manner that best matches computational accuracy requirements of a particular phase of a mathematical algorithm executing on the reconfigurable processing device. This may be implemented to allow the smallest and fastest possible computational structure that meets the needed accuracy to be used during each computational phase of an algorithm.

It will be understood that a lower precision but faster computational speed structure may be any type of computational structure that performs a greater number of mathematical steps per given unit of time to obtain a lower accuracy solution relative to any other type of computational structure that performs a lesser number of mathematical steps per the same given unit of time to obtain a higher accuracy solution. Examples of pairs of lower precision/higher speed computational structures relative to higher precision/lower speed computational structures include a lower precision fixed-point iterative computational structure relative to a higher precision floating-point computational structure, a lower-precision fixed point computational structure relative to a higher precision fixed-point computational structure, a lower-precision floating-point computational structure relative to a higher precision floating-point computational structure, etc. As an example, a floating-point computational structure is not restricted to single-precision or double-precision methods, but rather a wide range of number of bits may be employed for the mantissa and a wide range of number off bits may be employed for the exponent such that precision and computational speed may vary considerably between different floating-point computational structures.

Typical mathematical operations executing on a general processing device require floating-point dynamic range to remain flexible for a wider variety of general purpose calculations, to support a wider variety of general purpose applications, and be portable within a wider variety of general purpose computers; and perhaps primarily, to make the mathematics efforts totally transparent for the programmer. However, for particular operations, the increased dynamic range of floating-point calculations is not needed, and fixed-point calculations may be sufficient. In this regard, fixed-point calculations achieve greater processing speeds and utilize processing device real estate more efficiently. Advantageously, using one exemplary embodiment of the disclosed systems and methods an algorithm may be dynamically adapted in real time to switch between fixed-point calculations in a first phase to floating-point calculations in a second phase, and vice versa. This advantageously allows the use of fixed-point representations to achieve greater processing speeds processing device efficiency during particular application computation phases that do not require a floating-point dynamic range. Thus, an algorithm may be prefigured (e.g., by a developer) to control the numerical representations so that fixed-point operations may be employed in a first hardware phase to perform a known application at those times when using fixed-point operations is the most reasonable implementation, and so that floating-point operations may be employed in a second hardware phase when needed at other times.

Figure 1:
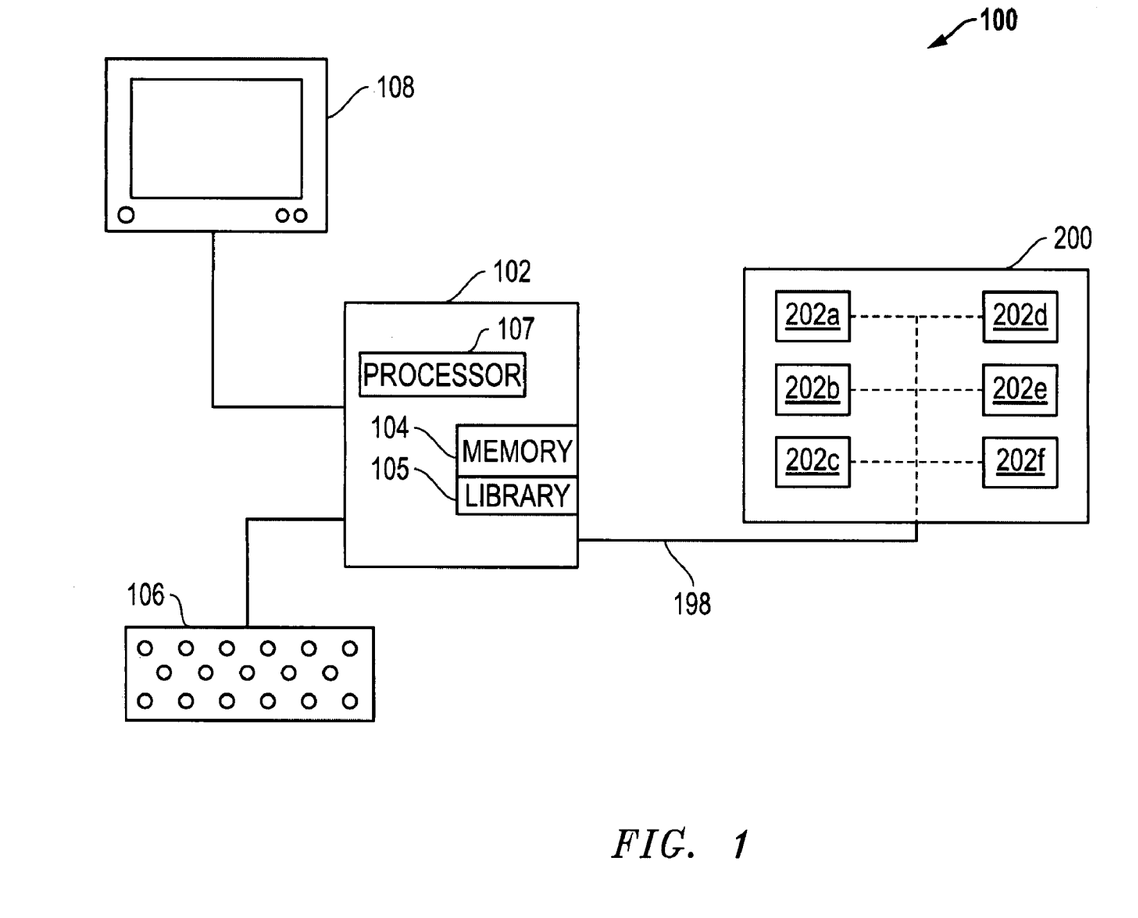
FIG. 1 illustrates a data processing system according to one exemplary embodiment of the disclosed systems and methods.

FIG. 1 illustrates a data processing system 100 which may be implemented in one exemplary embodiment to employ multiple hardware phases (e.g., fixed-point and floating-point phases) mapped to multiple algorithm phases for the solution of an iterative problem using a reconfigurable integrated circuit processing device 200 which may be, for example, a reconfigurable ASIC device such as a FPGA. As shown in FIG. 1, computer processing system 102 which is coupled by a datapath 198 to processing device 200 across which dynamic partial reconfiguration of processing device 200 may be performed. As shown in FIG. 1, a library 105 may be stored in non-volatile memory 104 (e.g., Flash memory, hard disk drive, etc.) of a personal computer or other suitable computer processing system 102. Library 105 may contain multiple available functions (e.g., fixed-point and floating-point functions) in the form of hardware setups for processing device 200 which are maintained in the form of pre-compiled "bit files" intended for partial reconfiguration of a selected function into one of multiple partial reconfiguration (PR) blocks 202 of processing device 200.

In the embodiment of FIG. 1, a selected bit file may be supplied dynamically to the processing device 200 through datapath 198 and the normal programming configuration interface of processing device 200. As further shown, computer processing system 102 may include a processor device 107 (e.g., CPU) configured to execute programming that presents a partial reconfiguration graphical user interface (GUI) to a user on display 108. A user may utilize the one or more I/O devices 106 (e.g., keyboard, mouse, etc.) of the computer processing system 102 to select particular bit files for initial configuration, or for partial or full reconfiguration of one or more IPR blocks 202 of processing device 200, e.g., without needing any knowledge of VHDL. In addition to the reconfiguration GUI, computer processing system 102 may also optionally run any other development tools required for programming of processing device 200.

Further information on example systems and methods that may be employed for partial reconfiguration of a reconfigurable processing device for the solution of an iterative problem may be found in concurrently filed U.S. patent application Ser. No. 12/655,181 entitled "Heterogeneous Computer Architecture Based On Partial Reconfiguration" by Yancey, et al., which is filed on the same day as the present patent application and which is incorporated herein by reference in its entirety. In one embodiment, partial reconfiguration may be implemented on a reconfigurable processing device using a non-reconfigurable interconnection template to allow interchangeable partial reconfiguration (IPR) blocks of the processing device to be selectively and dynamically interconnected and/or disconnected in standardized fashion from communication with a packet router within the same processing device. However, any other hardware and/or methodology may be employed that is suitable for dynamic partial or full reconfiguration of a reconfigurable processing device, including those partial reconfiguration techniques that employ a non-standardized interface for connection with PR blocks of a reconfigurable processing device, and those full reconfiguration techniques that reconfigure all internal blocks or modules or a reconfigurable processing device during each reconfiguration phase change.

Thus, it will be understood that the embodiment of FIG. 1 is exemplary and that any combination of reconfigurable processing device, system and/or methodology may be employed that is suitable for employing partial or full reconfiguration to implement dynamic partial or full multi-phase reconfiguration of processing device for solution of a problem in a manner as described herein. Other examples of processing devices besides a CPU that may be employed to implement reconfiguration include, but are not limited to, a complex programmable logic device (CPLD), soft-core or embedded processor in a separate FPGA, microcontroller, etc. As such, a configuration library may, for example, be stored on a flash memory device controlled by a complex programmable logic device (CPLD) or a soft/embedded processor in a separate FPGA, or may be stored in electrically erasable programmable read only memory (EEPROM) on a microcontroller, etc. Moreover, it is not necessary that there be human user interaction via a user interface or I/O devices to implement the multi-phase reconfiguration of a processing device, e.g., reconfiguration from a first computational phase to a second computational phase may occur in automated or automatic fashion based on value of computational error level.

It will also be understood that the disclosed systems and methods may be implemented with any type of processing device having internal modules or sub-units that are dynamically reconfigurable to perform different functions or tasks. Examples of such processing devices include, but are not limited to, reconfigurable ASIC devices such as FPGAs or other field programmable devices ("FPDs") or programmable logic devices ("PLDs"), central processing unit ("CPU") or graphics processing unit ("GPU") that includes arithmetic logic units ("ALUs") having multiple selectable processing settings (e.g., multiple software-configurable precision settings), etc.

Figure 2A:
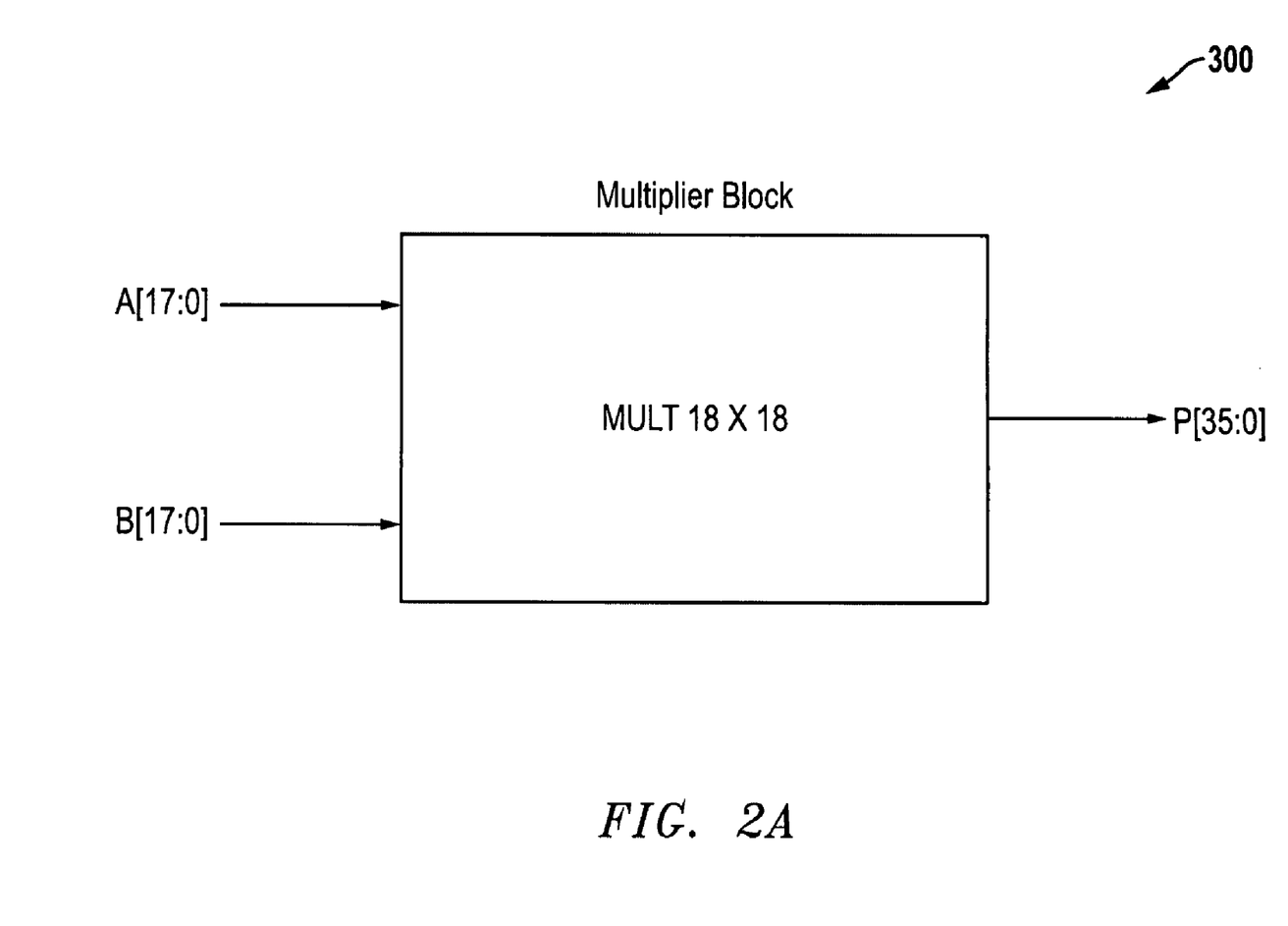
FIG. 2A illustrates a lower precision first phase structure in the form of a 18-bit multiplier configuration according to one exemplary embodiment of the disclosed system and methods.
Figure 2B:
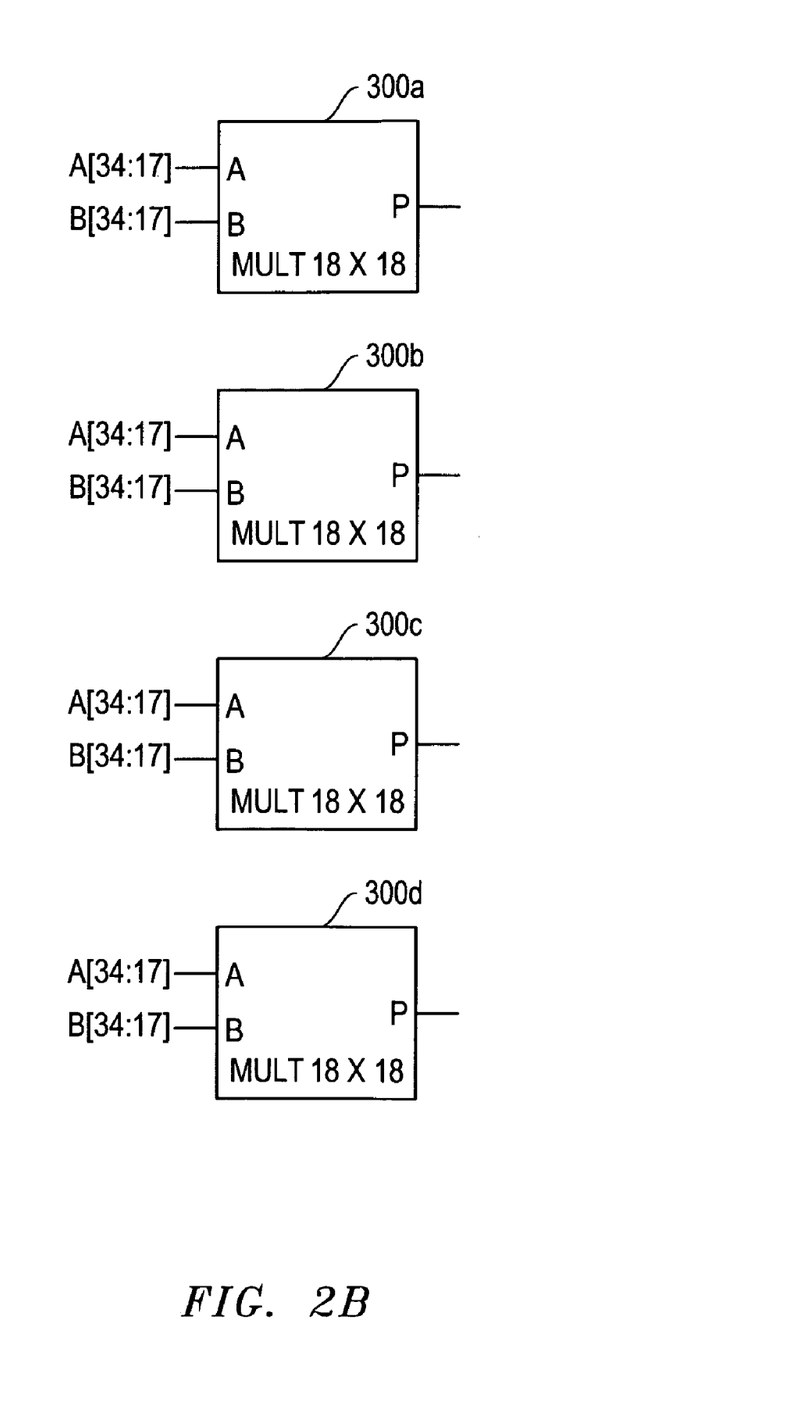
FIG. 2B illustrates a lower precision first phase structure in the form of a four 18-bit multiplier configuration according to one exemplary embodiment of the disclosed system and methods.

In fixed-point representation there is a tradeoff between the speed of the calculation and the accuracy of the resulting computation. For example, this tradeoff may be illustrated by multiplication processes within a reconfigurable processing device such as the Virtex-II Pro® FPGA available from Xilinx, Inc. of San Jose, Calif. In one embodiment, such a reconfigurable processing device may be configured to use one or more optimized embedded 18-bit signed multipliers 300 for first phase low precision multiplication operations as illustrated in FIG. 2A. For example, a processing device 200 may be configured, for example, with four of 18-bit multipliers 300a-300b as shown in FIG. 2B to provide four 36-bit results in a single multiplier primitive single cycle calculation configuration. However, when more bits of precision are needed in a second and subsequent algorithm phase, a next level of multiplier with optimal second phase architecture considerations may be provided as described further below. This may be implemented in the same structure of processing device 200 at the expense of real estate and speed over the four single 18-bit multipliers 300 shown in FIG. 2B.

Figure 3:
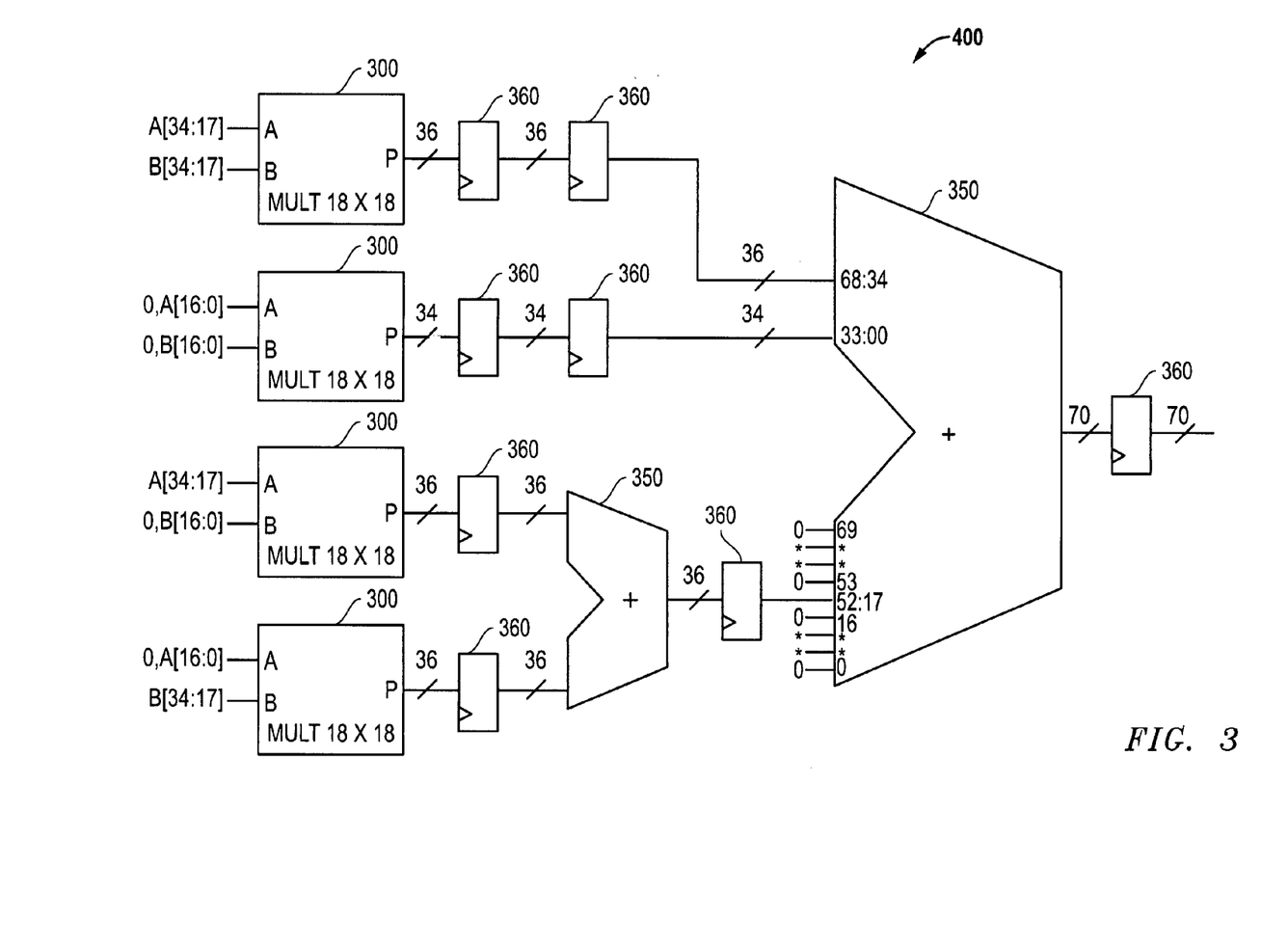
FIG. 3 illustrates a higher precision second phase structure in the form of a 36-bit multiplier configuration according to one exemplary embodiment of the disclosed system and methods.

FIG. 3 illustrates an example of a higher precision second phase structure in the form of a 36-bit fixed-point multiplier 400 having 35 bits of precision with which the same reconfigurable processing device of FIGS. 2A and 2B may be dynamically reconfigured. Multiplier 400 may be implemented within reconfigurable processing device 200 using four of the 18-bit embedded multipliers 300 of FIG. 2A and also including two adders 350 as shown in a three cycle calculation configuration. In FIG. 3, registers 360 are coupled as shown between multipliers 300 and adders 350, and between adders 350 to ensure proper synchronization of the data between stages. Registers 360 add time latency which slows the computational processing speed. When implemented in a conventional reconfigurable processing device such as the Virtex-II Pro® FPGA, this 36-bit multiplier configuration slows down processing speed of the parallel implementation proportionally, i.e., the four 18-bit multiplier of configuration of FIG. 2B calculates approximately 12 times faster (4 multipliers having 3 times less latency per multiplier) than the high precision single 36-bit multiplier configuration of FIG. 3. Thus, inspection shows that the loss of multipliers for concurrent multiplication and the latency delays result in the higher 36-bit multiplication hardware being effectively 12-times slower for each independent iteration calculation. In a conventional implementation, pipelining may be used to mitigate the latency delays in some situations. However, using the disclosed systems and methods, the fixed-point 18-bit multiplier 300 may be selectively and dynamically substituted for the 36-bit multiplier 400 in those algorithm phases that do not require the accuracy of 36 bit calculations.

One example of iterative algorithm for which calculation speed and efficiency may be enhanced using the disclosed systems and methods is the Jacobi method. Thus, in one exemplary embodiment, a Jacobi solver may be implemented in reconfigurable processing device (e.g., FPGA) hardware for the solution of a set of linear equations using the Jacobi method, e.g., for high performance vector processing. Such a solution involves a number of possible calculation tradeoffs that may be made based on the primary motivation of speed versus accuracy. In this embodiment, examples of possible tradeoffs include choice of numerical representation (fixed-point versus floating-point, with fixed-point representation achieving greater calculation speeds while using FPGA real estate more efficiently), and/or the number of bits to use with either fixed- or floating-point representation.

It will be understood that the disclosed systems and methods may be implemented with other types of iterative algorithms, as well as any other type of algorithm or processing situation where need for solution accuracy varies during different phases of computational processing. Specific examples of other types of iterative algorithms with which the disclosed systems and methods may be implemented include, but are not limited to, Gauss-Seidel, conjugate gradient, optimization methods, etc. Specific examples of non-iterative algorithms which may be implemented with the disclosed systems and methods include, but are not limited to, finite difference, wave-equation depth migration, molecular dynamics, etc. Besides multipliers such as illustrated in FIGS. 2A, 2B and 3, examples of other types of computational structures with which a reconfigurable processing device may be reconfigured include, but are not limited to, adders, dividers, etc.

In the operation of the Jacobi method, precision significantly impacts determination of iterative convergence. Convergence may be determined by observing the values of either the unknown vector or solution vector. It cannot be controlled to values better than the precision available because no information can be provided in that range. Thus, in such an algorithm, high accuracy solutions cannot be obtained by low precision mathematics alone. However, it will be understood that the disclosed systems and methods may be employed to enhance speed and efficiency of any other algorithm having the characteristics of either convergence or multi-precision input data. In this regard, convergence may be the result of iterative processes, as in matrix-equation solutions, optimization processes, or equilibrisation, as in time-dependent conservation-law methods. Multi-precision input data may be the result of geometrical discretization, such as in finite-element methods, output data from another program or process, human-generated data, measurements conducted by instruments of differing precisions, or data compression that limits precision during storage.

In one exemplary embodiment that follows, hardware in the form of a reconfigurable processing device 200 (e.g., FPGA device) may be dynamically reconfigured (in part or in whole) in a manner that is coordinated with different algorithm phases during the convergence stage of the Jacobi method. In this exemplary embodiment, two precision phases may be developed for two error levels. In the first low precision phase, the FPGA 200 is configured with 18-bit-multipliers 300 and the iterations are stopped at a higher error point (e.g., at about 10%). In the first phase, the minimum possible error is constrained by the maximum precision available given the bit size of the 18-bit multipliers and fixed-point scaling. At the completion of the first low precision phase, the FPGA 200 is then dynamically reconfigured for the second higher precision phase with 36-bit multipliers 400. Iterations continue starting with the last vector values from the first low precision phase as the starting vector for the second high precision phase. The overall solution time $t_{low/high}$ for the disclosed multi-phase process attained is based on the solution time $t_{low}$ required for the number of low-precision iterations that are accomplished with the higher speed configuration of the first phase combined with the solution time $t_{high}$ required for the lower number of high-precision iterations of the second phase needed to get to the final error level required, plus the process device full or partial reconfiguration time $t_{rcfg}$ between the first and second phases.

An analysis of the above-described multi-phased error level reconfiguration process shows that using both high and low precision in the algorithm and hardware phases, the relative solution time between a conventional single-phase process and the disclosed multi-phase process may be expressed as follows:

$$t_{single\_phase} > t_{low/high} = t_{rcfg} + t_{high} + t_{low}$$

In the above equation, the "low" phase refers both to precision and accuracy of the first phase relative to a subsequent higher precision and accuracy second phase. In this regard, the low phase may provide an improved starting vector for a subsequent "high" second phase of the algorithm, rather than a final solution. Using the disclosed multi-phased methodology, fewer high-precision iterations will be required to finalize the high-accuracy solution than are required in a conventional single-phase (high precision) case. This results in acceleration of the overall solution time, not a reduction in the total number of iterations. That is:

$$t_{low/high} = t_{rcfg} + N_{mat}\left(K_{high}\frac{N_{iter\_high}}{N_{mult\_high}} + K_{low}\frac{N_{iter\_low}}{N_{mult\_low}}\right)$$

where:
$N_{mat}$ represents matrix size,
$N_{iter\_high}$ represents iteration count for the high phase,
$N_{iter\_low}$ represents iteration count for the low phase,
$N_{mult\_high}$ represents the number of multipliers constructed in the high phase,
$N_{mult\_low}$ represents the number of multipliers constructed in the low phase,
$K_{high}$ is a relative constant related to the speed of calculation for the high phase, and
$K_{low}$ is a relative constant related to the speed of calculation for the low phase.

Assuming the linear system is sufficiently large such that: $t_{rcfg} >> t_{high}$, the final relationship that is found between the calculation time required by the disclosed multi-phased algorithm as compared to a single-phase (strictly high-precision) algorithm is:

$$\frac{t_{low/high}}{t_{single\_phase}} \approx \eta\left(\delta\frac{\beta}{\alpha} + 1\right) = Speedup^{-1}$$

where:
δ is the ratio of low precision and high precision iteration counts in the multi-phase implementation,
α/β is the low-precision phase efficiency, and
η is the high-precision phase iteration ratio.

Speedup is equal to the ratio of original solution time to multi-phase solution time. Any number above 1 indicates the process is faster (i.e., speeding up) using multi-phase processing. Thus, a speedup number of 2 means the multi-phase processing is reaching the same solution in half the time as conventional single-phase processing, while a speedup of 4 reflects a multi-phase solution time of one quarter of the overall original single-phase solution time, and a speedup number of 8 reflects a multi-phase solution time of one eighth of the overall original single-phase solution time, etc.

In the case of an iterative problem, it will be understood that the absolute computation times for a given problem solution are dependent on several parameters, i.e., the size of the matrix being resolved, the error thresholds for each phase, the reconfiguration time necessary between phases and the convergence rate of the process which depends on both the matrix values and the iterative process being used to solve the problem. A speedup factor analysis based on a high level parameter sensitivity review on the preceding example shows that a useful speedup typically ranging from about 1.75 to about 2.2 may be expected, which indicates that a process that uses the 36 bit multiplier and takes any one of 2 seconds, 2 hours, or 2 days to complete will take 1 second, 1 hours or 1 day, respectively, using the multi-phase process.

In the practice of the disclosed systems and methods, Speedup is gained by replacing high-precision iterations with relatively inexpensive low-precision iterations. The limiting factor is the percent reduction in high-precision iterations. Although particular examples of lower and higher precision computational structures are illustrated and described herein with respect to FIGS. 2A, 2B and 3, it will be understood that a "low" phase computational structure may be any given computational structure that has lower precision and faster computational speed relative to another given higher precision and slower computational speed "high" phase computational structure. In this regard, computational speed refers to the number of iterations or other mathematical steps performed per a given duration of time.

Further, it will be understood that more than two computational structures of different relative precision and accuracy may be employed in a multi-phase error-level reconfiguration scheme. In this regard, an arbitrary number of computational structures may be employed to execute a mathematical algorithm having a corresponding arbitrary number of multiple phases (e.g., any selectable number of two or more multiple phases up to a large number of multiple phases). For example, three different computational structures of increasing precision and decreasing computational speed may be employed in a three-phase error-level reconfiguration scheme, four different computational structures of increasing precision and decreasing computational speed may be employed in a four-phase error-level reconfiguration scheme, etc. Alternatively, it is possible that a given phase having a higher precision and slower computational speed structure may precede a different phase having a lower precision and faster computational speed structure, i.e., lower precision and higher computational speed structures may be dynamically alternated with higher precision and slower computation speed structures in any manner that increases overall problem solution speed. Further, Table 1 presents theoretical speedup results with multi-phase error-level reconfiguration for varying values of the high-precision iteration ratio and the low-precision efficiency. The estimation of $\alpha/\beta=12$ is based on the availability of four time the number of multipliers and the 3× latency efficiency from the adder registers and adders (in the absence of pipelining).

TABLE 1

Theoretical Speedup Calculations for Multi-phase Error-Level Reconfiguration

| η | α/β | δ | Speedup |
|---|---|---|---|
| 0.4 | 12 | 1 | 2.31 |
| 0.6 | 12 | 1 | 1.54 |
| 0.8 | 12 | 1 | 1.15 |
| 1 | 12 | 1 | 0.92 |

Table 2 shows example performance results obtained while solving three different sets of linear equations by applying multi-phase error-level reconfiguration to the Jacobi method. Row 1 is a well conditioned symmetric sparse matrix. Row 2 is a similar matrix with more non-zero entries. Row 3 is poorly conditioned with decreased diagonal dominance, yet maintains a convergent solution. As seen from Table 2, the speedup is real and measurable for the Jacobi method. The low precision phase terminated convergence at a 10% error compared to 0.1% error level for the high precision phase. The low precision calculations were made using 17 bits and the high precision calculations were made using 35 bits.

TABLE 2

Jacobi Method Convergence Speedup with Multi-phase Error-level Reconfiguration

| η | α/β | δ | Speedup |
|---|---|---|---|
| 0.500000 | 12 | 1.181818 | 1.82 |
| 0.557692 | 12 | 1.034483 | 1.65 |
| 0.497537 | 12 | 1.19802 | 1.83 |

Figure 4:
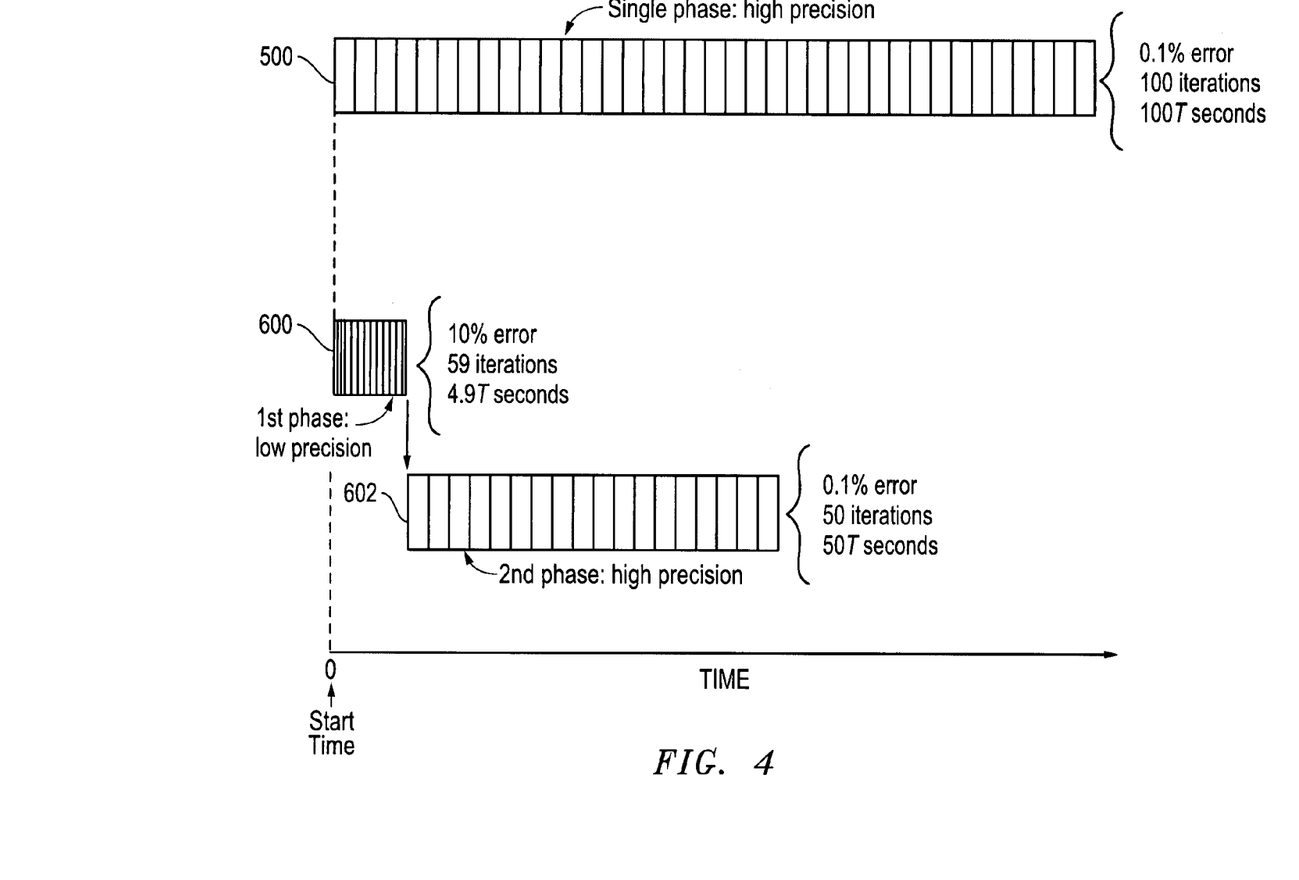
FIG. 4 illustrates computation time for convention single-phase computation methodology and multi-phase error-level reconfiguration computation methodology according to one exemplary embodiment of the disclosed systems and methods.

FIG. 4 illustrates the faster speed obtained using multi-phase error-level reconfiguration over convention single-phase computation methodology for the Jacobi method example of Tables 1 and 2. In particular, single-phase high precision processing 500 terminates with a 0.1% error level after 100 iterations and a time of 100T seconds, where "T" is a relative constant rather than measurement. In contrast, the multi-phase processing of this example includes first phase low precision processing 600 that terminates with a 10% error level after 59 iterations and a time of 4.9T seconds, and is followed by second phase high precision processing 602 that terminates with a 0.1% error level after 50 iterations and 50T seconds incremental from start of the second phase (i.e., making the total multi-phase solution time equal to 54.9T seconds). Thus, the same final precision level (or accuracy) is obtained with multi-phase processing in less total time and with only slightly more total iterations including the reconfiguration time than the conventional single-phase processing which employs fewer, slow high-precision iterations.

In one exemplary embodiment, changing error level values during the different algorithm phases may be used to automatically terminate convergence processes between different phases of the calculations in order to gate processing device reconfiguration between phases. For example, referring to the previous Jacobi method example of Table 2, the first low precision (17 bit) phase may automatically terminate convergence at a predefined 10% error value and transition to the second high precision (35 bit) phase which may automatically terminate convergence at a 0.1% error value. Such an automatic convergence methodology may be used to trigger transitions between two or more processing phases of increasing precision, and may be implemented, for example, by an external processor device 107 such as illustrated in FIG.

1 that is coupled to monitor the processing results of a reconfigurable processing device 200. In such an embodiment, processing may start with the highest speed/lowest precision computational phase, and at the end of each respective processing phase, a previous lower precision/higher speed computational phase may be replaced with a succeeding higher precision/lower speed computational phase.

It will be understood that one or more of the tasks, functions, or methodologies described herein may be implemented, for example, as firmware or other computer program of instructions embodied in a tangible computer readable medium that is executed by a CPU, microcontroller, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method for dynamically reconfiguring a processing device, comprising:
   providing a reconfigurable processing device, the processing device being at least partially reconfigurable from a first computational structure configured to process data with a first precision at a first computational speed to a second computational structure configured to process data with a second precision at a second computational speed, the second precision and second computational speed being different than the first precision and the first computational speed;
   processing data with the first computational structure in a first computational phase to produce a first phase solution;
   then dynamically reconfiguring at least a portion of the processing device from the first computational structure to the second computational structure; and
   then processing data of the first phase solution with the second computational structure in a second computational phase to produce a second phase solution.

2. The method of claim 1, where the second precision is higher than the first precision and the first computational speed is faster than the second computational speed.

3. The method of claim 1, where the first and second phases are separate phases of an iterative mathematical algorithm, the second precision being higher than the first precision and the first computational speed being faster than the second computational speed.

4. The method of claim 1, further comprising processing data with the first computational structure in the first computational phase to produce the first phase solution having a first error level; and then dynamically reconfiguring at least a portion of the processing device from the first computational structure to the second computational structure and processing data of the first phase solution with the second computational structure in the second computational phase to produce the second phase solution having a second error level, the first error level being greater than the second error level.

5. The method of claim 1, where the first and second phases are separate phases of an iterative mathematical algorithm; and where the method further comprises processing data with the first computational structure in the first computational phase until the first phase solution has a first error level that meets a predefined minimum first error level threshold, and then dynamically reconfiguring at least a portion of the processing device from the first computational structure to the second computational structure and processing data of the first phase solution with the second computational structure in the second computational phase to produce the second phase solution having a second error level, the first error level being greater than the second error level; and where the method further comprises terminating the first computational phase and dynamically reconfiguring at least a portion of the processing device to the second computational structure based on the first phase solution achieving the first error level that meets the predefined minimum first error level threshold.

6. The method of claim 1, further comprising prefiguring the second computational structure prior to the step of processing data with the first computational structure in a first computational phase to produce the first phase solution; and then dynamically reconfiguring at least a portion of the processing device from the first computational structure to the prefigured second computational structure after processing data with the first computational structure in the first computational phase to produce the first phase solution.

7. The method of claim 1, where the first and second computational phases correspond to first and second phases of an mathematical algorithm that have different error level requirements.

8. The method of claim 1, where the processing device is at least partially reconfigurable from the second computational structure to a third computational structure configured to process data with a third precision at a third computational speed, the third precision being different than the first precision and second precision, and the third computational speed being different than the first computational speed and the second computational speed; and where the method further comprises:
   processing data with the first computational structure in a first computational phase to produce a first phase solution;
   then dynamically reconfiguring at least a portion of the processing device from the first computational structure to the second computational structure;
   then processing data of the first phase solution with the second computational structure in a second computational phase to produce a second phase solution;
   then dynamically reconfiguring at least a portion of the processing device from the second computational structure to the third computational structure; and
   then processing data of the second phase solution with the third computational structure in a third computational phase to produce a third phase solution.

9. The method of claim 1, where the reconfigurable processing device is a field programmable gate array (FPGA).

10. A system for dynamically reconfiguring a processing device, comprising:
    a reconfigurable processing device configured with a first computational structure configured to process data with a first precision at a first computational speed, the processing device being at least partially reconfigurable from the first computational structure to a second computational structure configured to process data with a second precision at a second computational speed, the second precision and second computational speed being different than the first precision and the first computational speed; and a computer processing system coupled by a datapath to the reconfigurable processing device, the computer processing system including memory and the second computational structure being prefigured in the memory of the computer processing system;

where the computer processing system is configured to dynamically reconfigure at least a portion of the processing device from the first computational structure to the second computational structure after data is processed with the first computational structure in a first computational phase to produce a first phase solution and before data of the first phase solution is processed with the second computational structure in a second computational phase to produce a second phase solution.

11. The system of claim 10, where the second precision is higher than the first precision and the first computational speed is faster than the second computational speed.

12. The system of claim 10, where the first and second phases are separate phases of an iterative mathematical algorithm, the second precision being higher than the first precision and the first computational speed being faster than the second computational speed.

13. The system of claim 10, where the first computational structure is configured to process data in the first computational phase to produce the first phase solution having a first error level; where the second computational structure is configured to process data in the second computational phase to produce the second phase solution having a second error level, the first error level being greater than the second error level; and where the computer processing system is configured to dynamically reconfigure at least a portion of the processing device from the first computational structure to the second computational structure after the first computational structure processes data in the first computational phase to produce the first phase solution and before the second computational structure processes the first phase solution data in the second computational phase to produce the second phase solution.

14. The system of claim 10, where the first and second phases are separate phases of an iterative mathematical algorithm; where the first computational structure is configured to process data in the first computational phase to produce the first phase solution having a first error level and where the second computational structure is configured to process data in the second computational phase to produce the second phase solution having a second error level, the first error level being greater than the second error level; and where the computer processing system is configured to terminate the first computational phase and dynamically reconfigure at least a portion of the processing device from the first computational structure to the second computational structure based on the first phase solution achieving a first error level that meets a predefined minimum first error level threshold.

15. The system of claim 10, where the first and second computational phases correspond to first and second phases of an mathematical algorithm that have different error level requirements.

16. The system of claim 10, where the processing device is at least partially reconfigurable from the second computational structure to a third computational structure configured to process data with a third precision at a third computational speed, the third precision being different than the first precision and second precision, and the third computational speed being different than the first computational speed and the second computational speed; and where the computer processing system is configured to dynamically reconfigure at least a portion of the processing device from the second computational structure to the third computational structure after data is processed with the second computational structure in a second computational phase to produce a second phase solution and before data of the second phase solution is processed with the third computational structure in a third computational phase to produce a third phase solution.

17. The system of claim 10, where the reconfigurable processing device is a field programmable gate array (FPGA).

18. A method for dynamically reconfiguring a processing device, comprising:

providing a reconfigurable processing device configured to execute a mathematical algorithm having multiple phases; and dynamically changing the configuration of the reconfigurable processing device while executing the algorithm on the reconfigurable processing device from a first computational structure corresponding to the accuracy requirements of a first phase of the mathematical algorithm to a second computational structure corresponding to the accuracy requirements of a second phase of the mathematical algorithm;

where the mathematical algorithm is an iterative algorithm, where the accuracy requirements of the second phase of the mathematical algorithm is greater than the accuracy requirements of the first phase of the mathematical algorithm and where the method further comprises:

executing the first phase of the mathematical algorithm on the reconfigurable processing device using the first computational structure with a first precision at a first computational speed prior to dynamically changing the configuration of the reconfigurable processing device, and initiating the second mathematical algorithm phase starting with data produced during the first mathematical algorithm phase, and executing the second phase of the mathematical algorithm on the reconfigurable processing device using the second computational structure with a second precision at a second computational speed after dynamically changing the configuration of the reconfigurable processing device, the second precision being higher than the first precision and the first computational speed being faster than the second computational speed.

19. The method of claim 18, where the method further comprises executing the first phase of the mathematical algorithm on the reconfigurable processing device using the first computational structure until the first phase solution has a first error level that meets a predefined minimum first error level threshold, and then dynamically reconfiguring at least a portion of the processing device from the first computational structure to the second computational structure and initiating the second mathematical algorithm phase starting with data produced during the first mathematical algorithm phase to produce the second phase solution having a second error level, the first error level being greater than the second error level; and where the method further comprises terminating the first phase of the mathematical algorithm and dynamically reconfiguring at least a portion of the processing device to the second computational structure based on the first phase solution achieving the first error level that meets the predefined minimum first error level threshold.

20. The method of claim 18, where the reconfigurable processing device is a field programmable gate array (FPGA).

21. The method of claim 18, where the reconfigurable processing device is configured to execute any mathematical algorithm having an arbitrary number of multiple phases; and where the method further comprises dynamically changing the configuration of the reconfigurable processing device while executing the algorithm on the reconfigurable processing device from a given computational structure corresponding to the accuracy requirements of all but the last of the arbitrary number of phases of the mathematical algorithm to another computational structure corresponding to the accuracy requirements of another successive phase of the mathematical algorithm.

* * * * *